Figure 1:
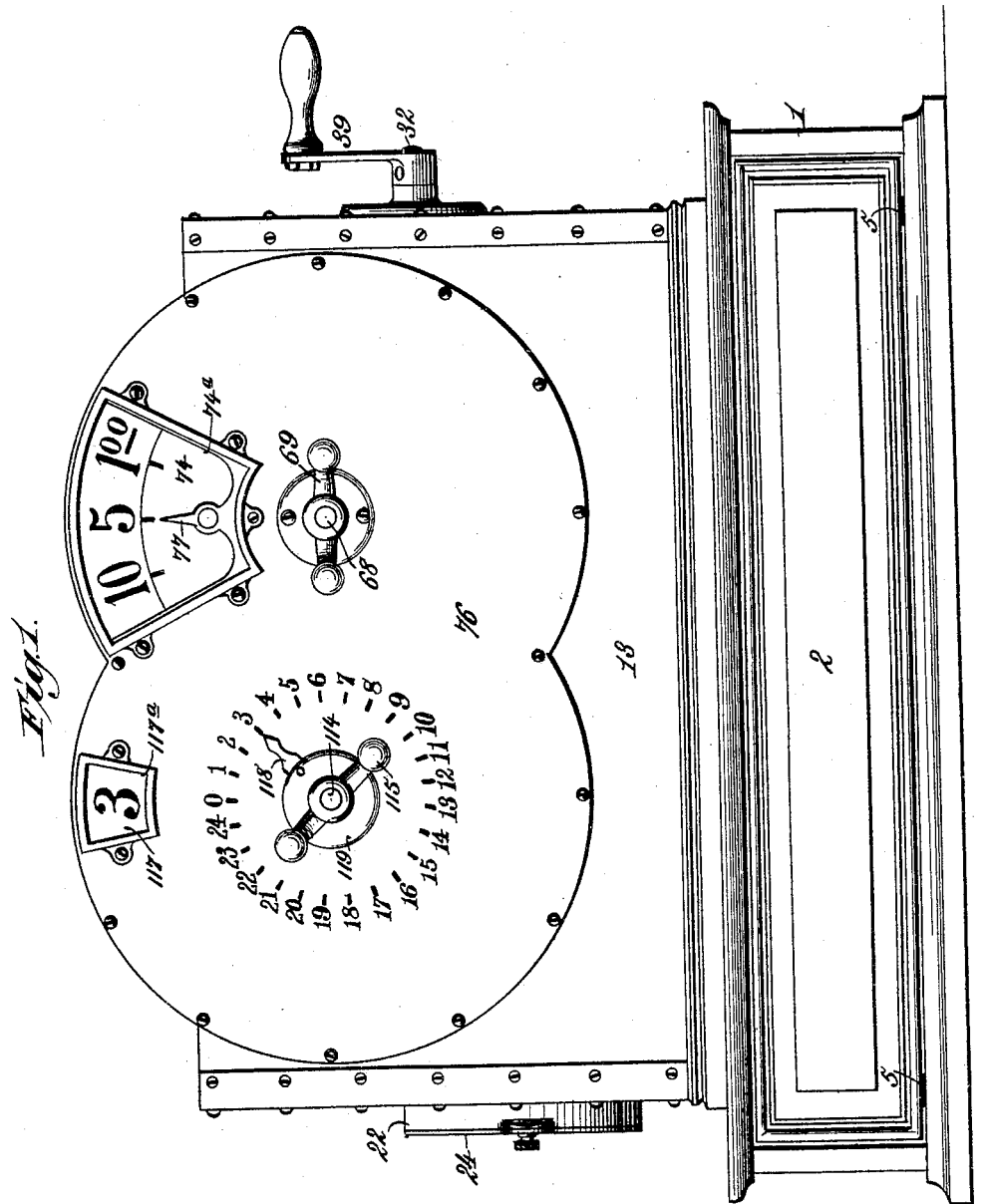

(No Model.)  
10 Sheets—Sheet 1.

E. MURPHY.
CASH REGISTER AND INDICATOR.

No. 488,150.  
Patented Dec. 13, 1892.

Witnesses.  
Robert Emmett,  
J. A. Rutherford.

Inventor.  
Edward Murphy,  
By James L. Norris.  
Atty.

(No Model.) 10 Sheets—Sheet 2.
E. MURPHY.
CASH REGISTER AND INDICATOR.

No. 488,150. Patented Dec. 13, 1892.

Witnesses: Inventor,
Edward Murphy.
By James L. Norris
Atty.

(No Model.)  10 Sheets—Sheet 3.
E. MURPHY.
CASH REGISTER AND INDICATOR.

No. 488,150. Patented Dec. 13, 1892.

Witnesses.
Robert Everitt,
J. A. Rutherford.

Inventor.
Edward Murphy.
By James L. Norris, Atty.

(No Model.)

10 Sheets—Sheet 4.

E. MURPHY.
CASH REGISTER AND INDICATOR.

No. 488,150. Patented Dec. 13, 1892.

Witnesses:
Robt. Burnett,
J. A. Rutherford.

Inventor:
Edward Murphy.
By James L. Norris
Atty.

(No Model.)
10 Sheets—Sheet 5.
E. MURPHY.
CASH REGISTER AND INDICATOR.
No. 488,150. Patented Dec. 13, 1892.
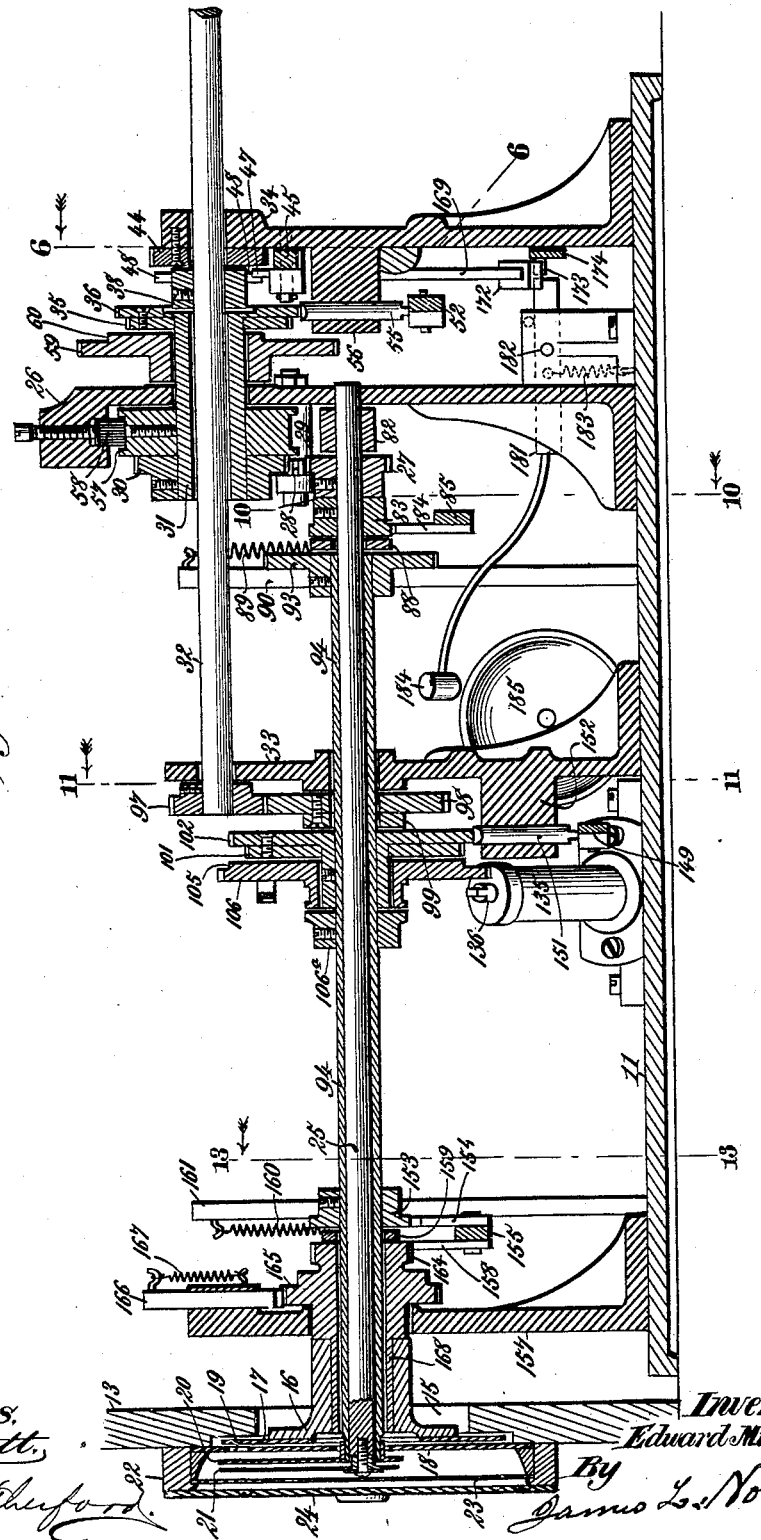
Witnesses.
Robert Everett.
J. A. Rutherford.
Inventor:
Edward Murphy.
By James L. Norris.
Atty.

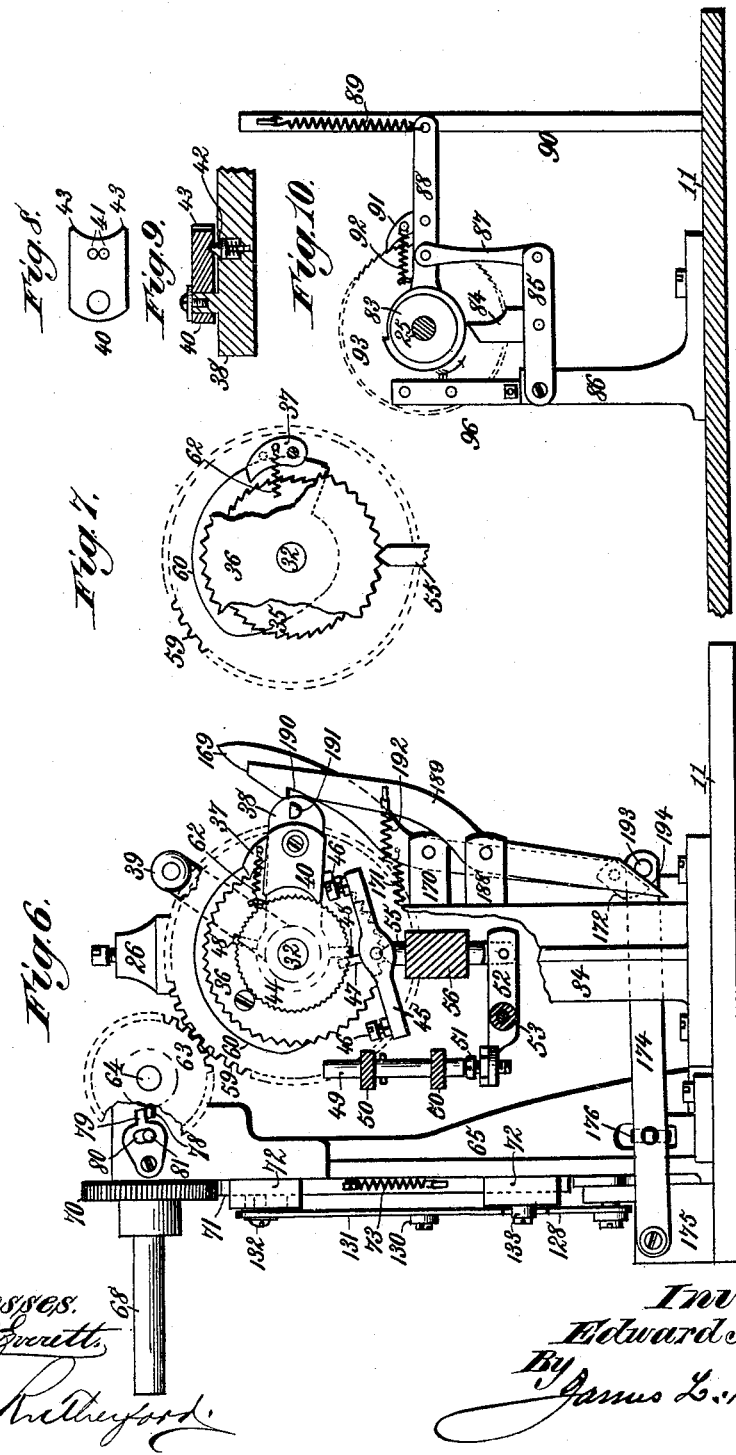

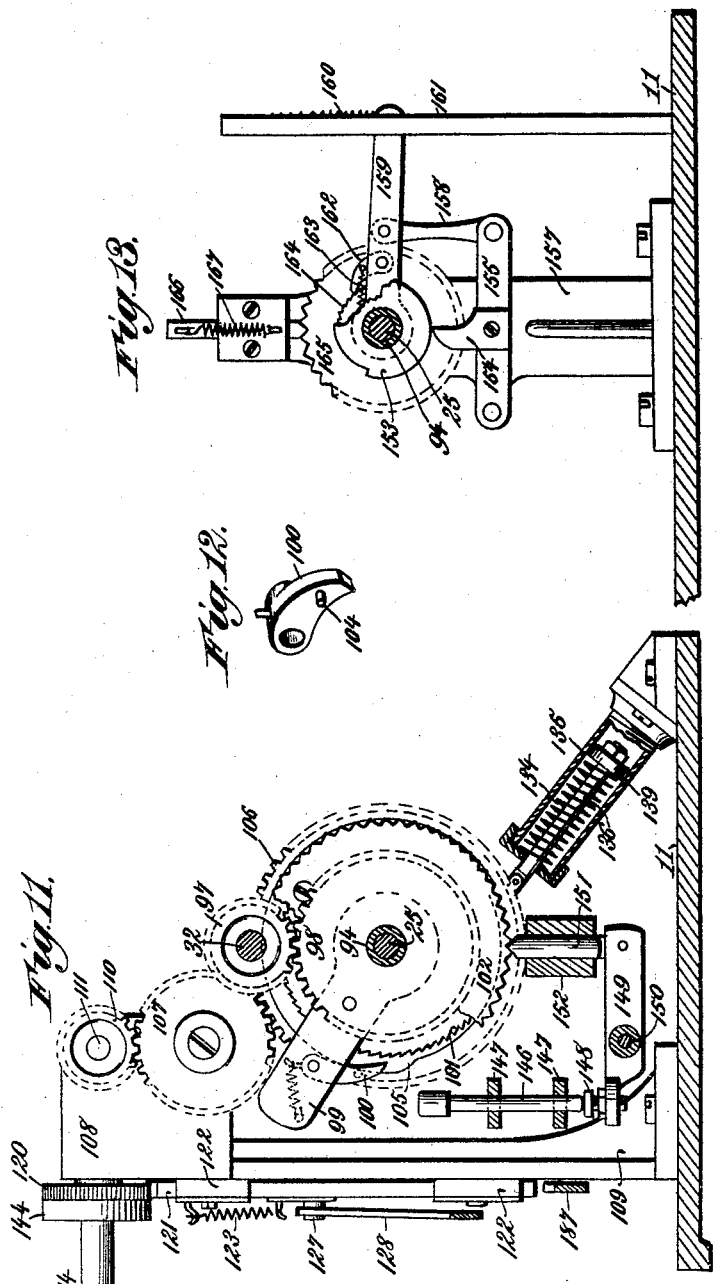

(No Model.) 10 Sheets—Sheet 8.
E. MURPHY.
CASH REGISTER AND INDICATOR.
No. 488,150. Patented Dec. 13, 1892.
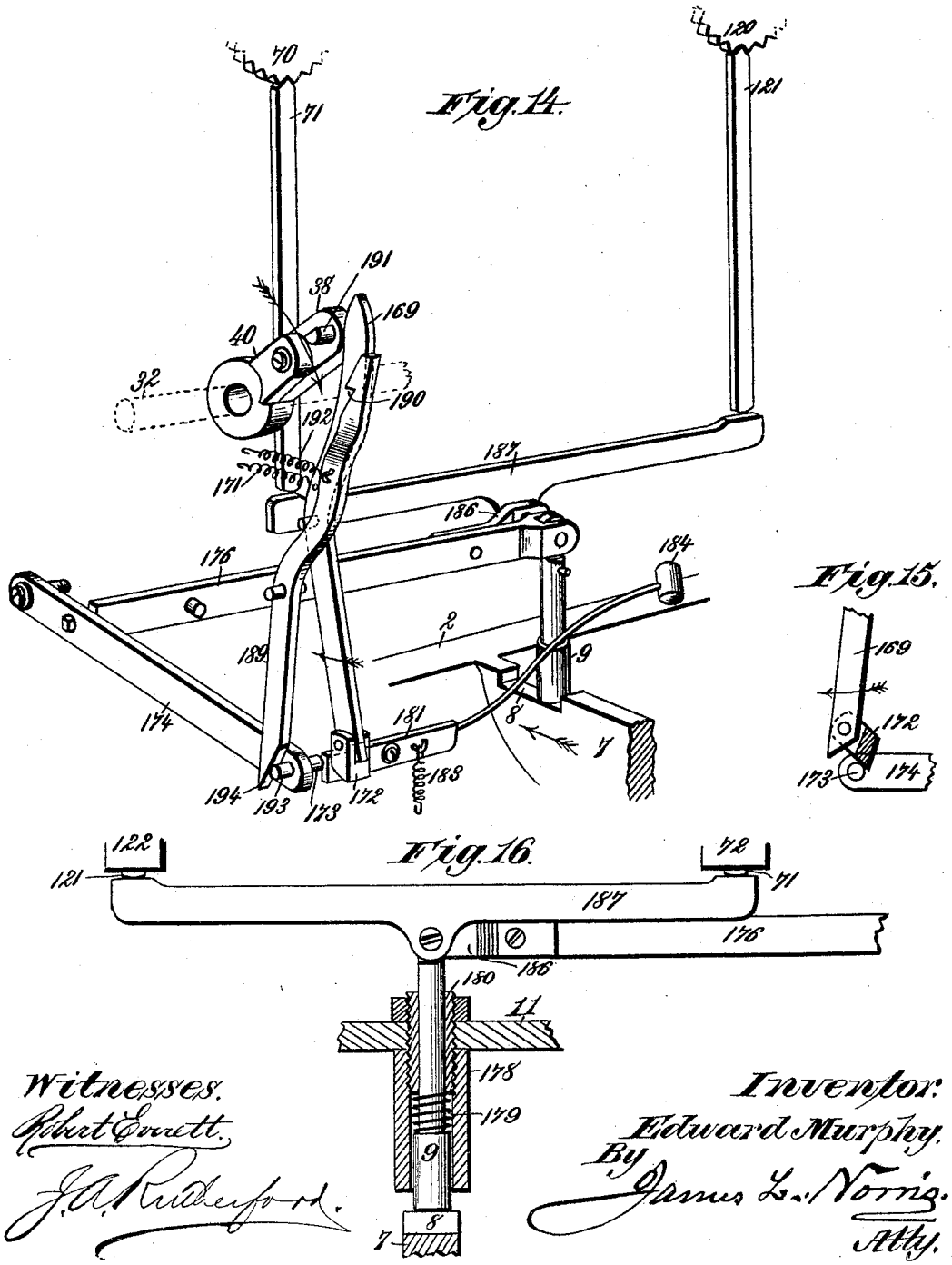

(No Model.) 10 Sheets—Sheet 9.

E. MURPHY.
CASH REGISTER AND INDICATOR.

No. 488,150. Patented Dec. 13, 1892.

Witnesses.
Robert Emmett
J. A. Rutherford

Inventor:
Edward Murphy.
By James L. Norris.
Atty.

(No Model.) 10 Sheets—Sheet 10.
E. MURPHY.
CASH REGISTER AND INDICATOR.
No. 488,150. Patented Dec. 13, 1892.
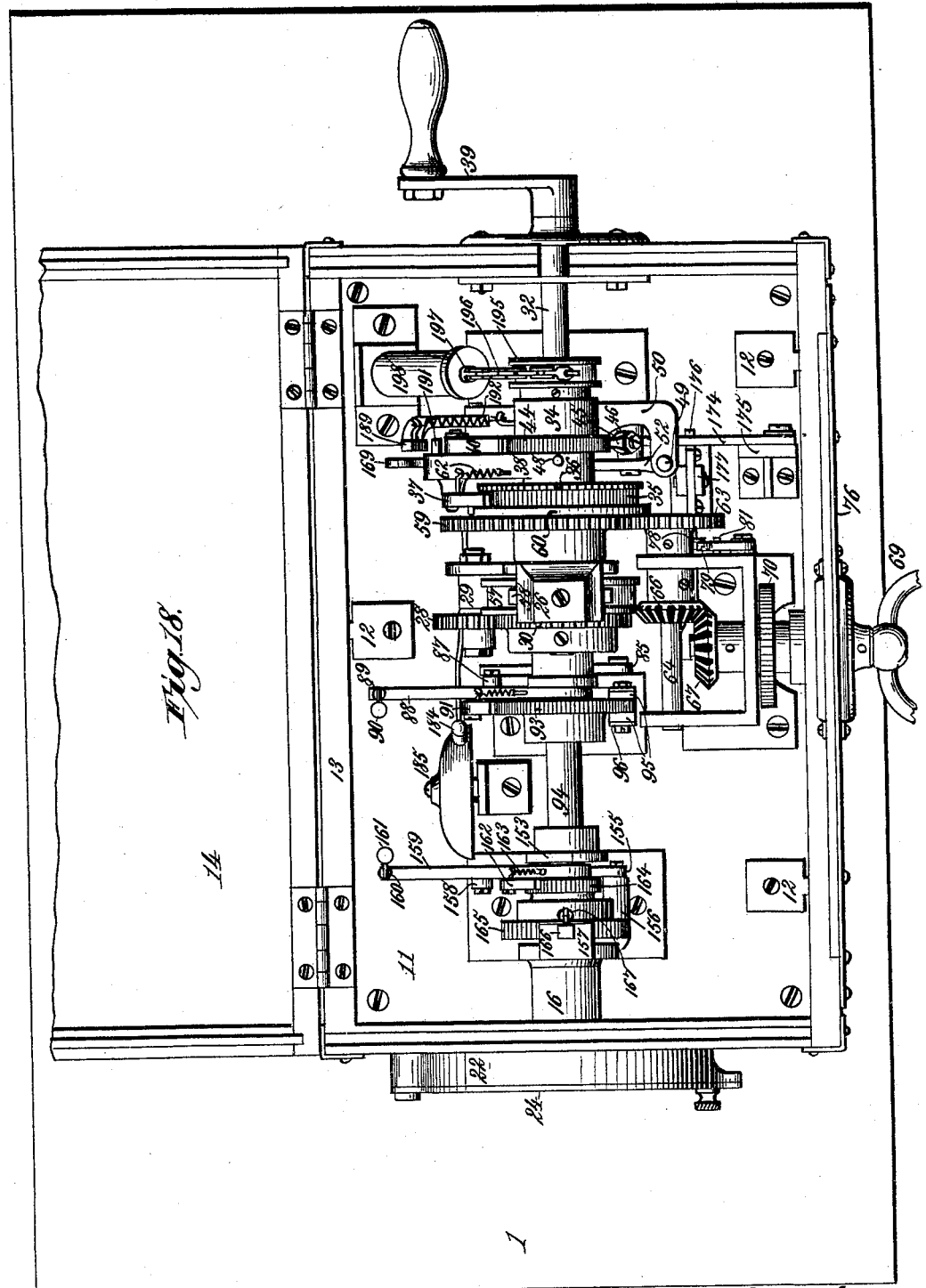
Witnesses:
Robert Everett,
J. A. Rutherford.
Inventor:
Edward Murphy,
By James L. Norris, Atty.

UNITED STATES PATENT OFFICE.

EDWARD MURPHY, OF NEW YORK, N. Y.

CASH REGISTER AND INDICATOR.

SPECIFICATION forming part of Letters Patent No. 488,150, dated December 13, 1892.

Application filed May 17, 1892. Serial No. 433,360. (No model.)

*To all whom it may concern:*

Be it known that I, EDWARD MURPHY, a citizen of the United States, residing at New York, in the county of New York and State of New York, have invented new and useful Improvements in Cash-Registers, of which the following is a specification.

This invention relates to a cash register and indicator comprising a "total-adder" or dials for showing in connection with suitable pointers the total amount registered by the machine during the period of its operation or until the limit of the machine is reached; a register mechanism actuated from a rock-shaft provided with an operating-handle; a setting mechanism for controlling the amount to be registered at any operation of the machine; a rotary dial actuated from the handle of the setting mechanism to indicate and display both to the cashier and the purchaser the amount to be registered; an automatically-opening cash-drawer having an automatic locking mechanism that is disengaged through the action of a series of levers operated by the return or recoil of the rock-shaft after the register mechanism has been actuated; an alarm automatically sounded on the unlocking and opening of the drawer, and devices for automatically locking the setting mechanism and the register mechanism against further operation until the drawer is again closed and automatically locked.

The invention consists in the construction, combination, and relative arrangement of devices in a cash-register, as hereinafter described and claimed.

Figure 2:
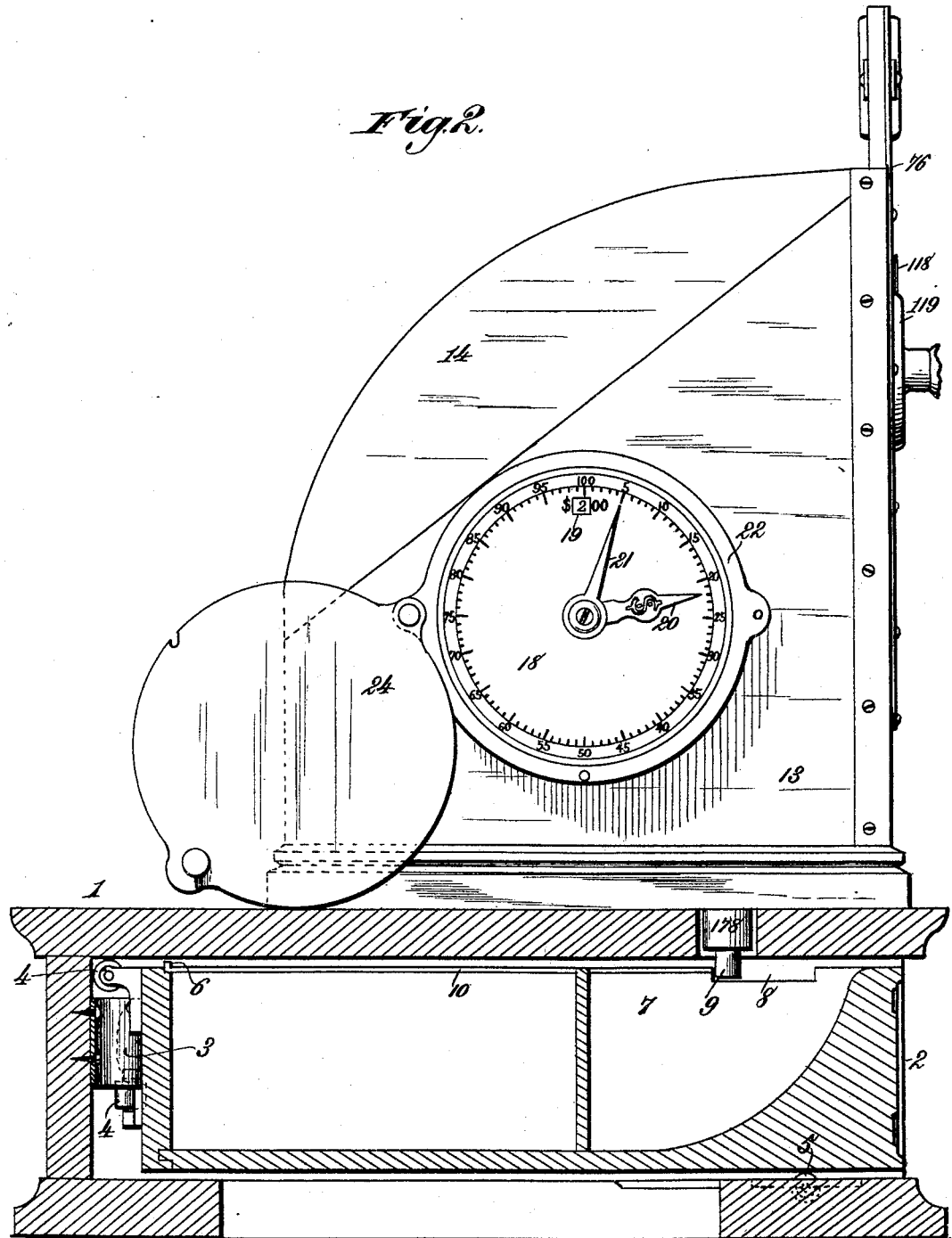
Figure 3:
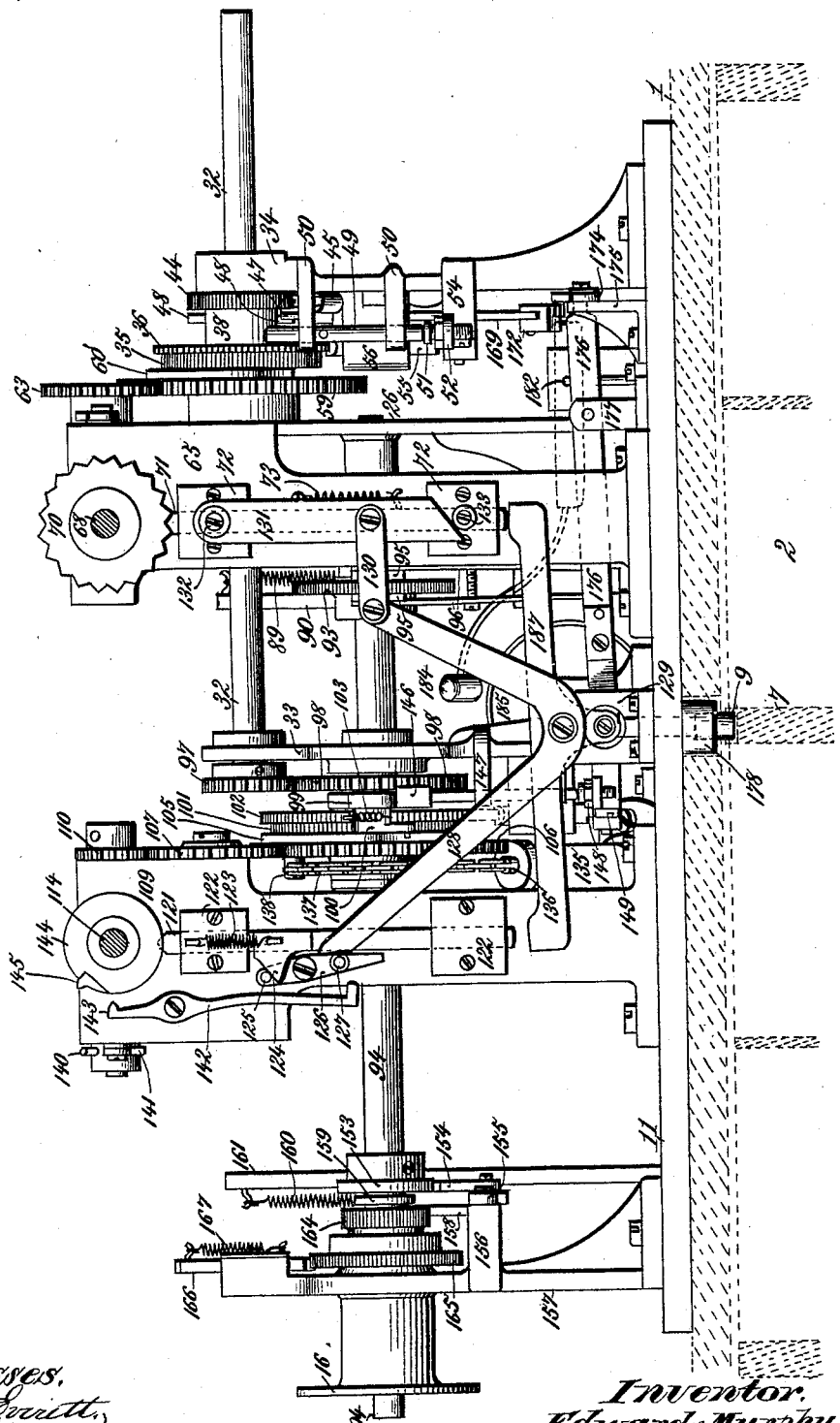
Figure 4:
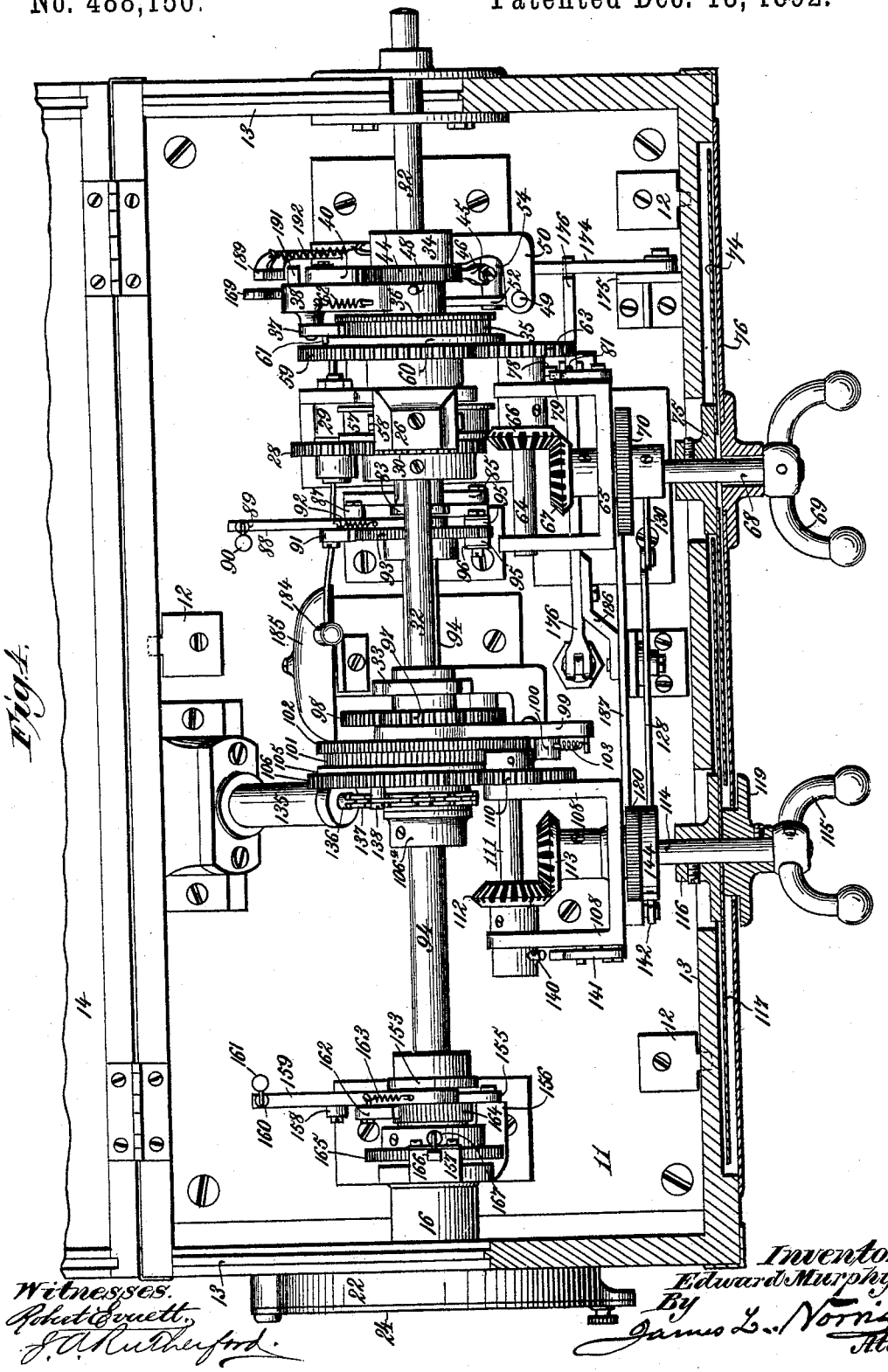
Figure 17:
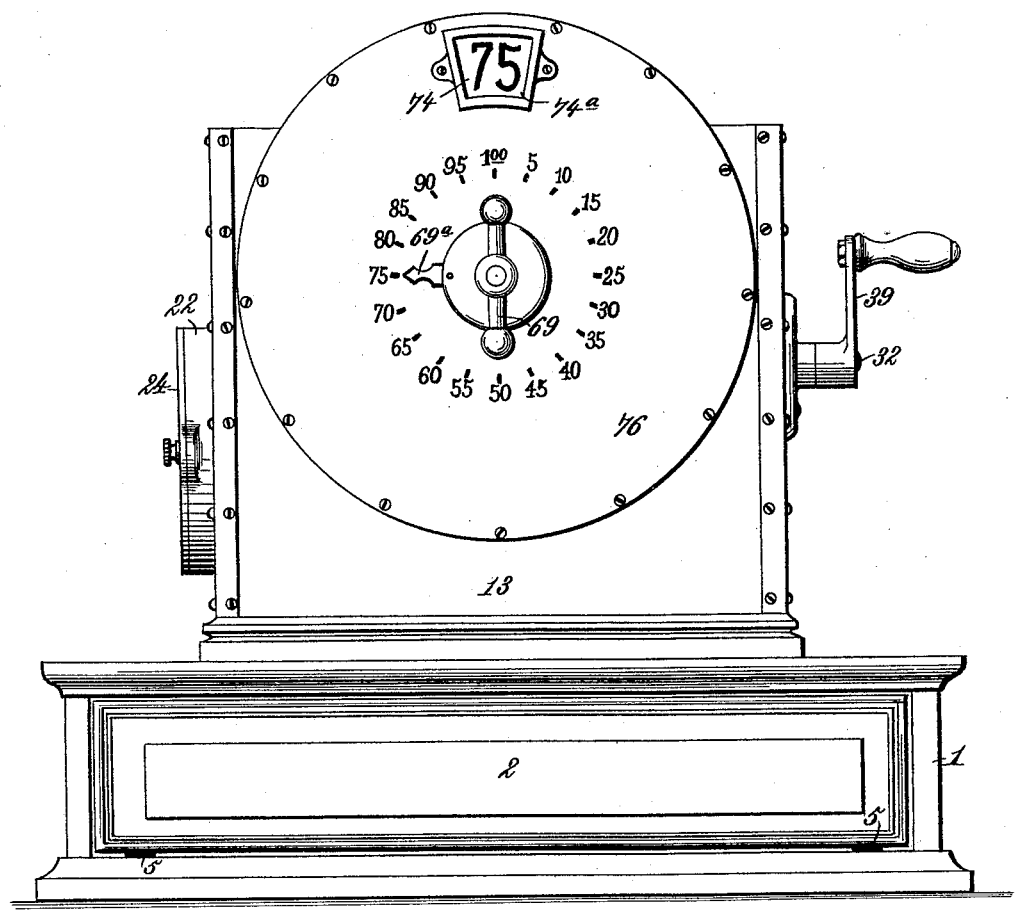

In the annexed drawings, illustrating the invention, Figure 1 is an elevation of a cash-register constructed according to my invention. Fig. 2 is a partly-sectional end elevation of the machine. Fig. 3 is an elevation of the machine with the casing and operating and setting handles removed. Fig. 4 is a partly-sectional plan with the hinged cover thrown open. Fig. 5 is a longitudinal sectional elevation. Fig. 6 represents a transverse section on the line 6 6 of Fig. 5. Fig. 7 is a detail view of a pawl-and-ratchet driving mechanism and devices for setting and stopping the same. Fig. 8 is a view of a reversible double-acting pawl. Fig. 9 is a longitudinal section of the same, showing in section a portion of the lever to which it is attached. Fig. 10 represents a transverse section on the line 10 10 of Fig. 5. Fig. 11 represents a transverse section on the line 11 11 of Fig. 5. Fig. 12 is a view of a driving-pawl. Fig. 13 represents a transverse section on the line 13 13 of Fig. 5. Fig. 14 is an enlarged perspective detail of mechanism actuated from the rock-shaft to disengage the locking-bolt from the cash-drawer, simultaneously sound an alarm, and automatically lock the setting mechanism and the register mechanism against further operation until the drawer is again closed and locked. Fig. 15 is a partly-sectional detail view. Fig. 16 is a partly-sectional elevation showing a portion of the cash-drawer and its locking-bolt and the device for automatically locking the setting mechanism when the drawer-locking bolt is raised. Fig. 17 is an elevation of a modified form of machine for registering only small amounts at one operation. Fig. 18 is a plan of the modified form of machine.

In Figs. 1 and 2 of the drawings, the reference-numeral 1 designates the base of the machine, which is in the form of a casing for the till or money-drawer 2, that is automatically locked when closed, but is unfastened by the movements of certain levers actuated through the operating devices of the cash-register mechanism, as hereinafter described. When relieved from the restraint of its locking mechanism, the drawer 2 is thrown open by the action of a spring 3, Fig. 2, supported within the casing 1. The unlocking and release of the drawer automatically locks the cash-register mechanism, and until the drawer is again fully closed and automatically locked the said cash-register mechanisms will remain inoperative. To facilitate the movements of the drawer within its casing, both the drawer and the said casing may be provided with antifriction guide-rollers 4 and 5 arranged at appropriate points. Any suitable stop, as 6, may be provided on the drawer to limit its outward movement and prevent it from being thrown wholly out of its casing by the action of the spring 3 when the drawer is unlocked. The drawer 2 is conveniently divided into several compartments by suitable partitions, and in the upper edge of one of these partitions 7 may be formed a recess 8 to engage a vertically and automatically movable locking-bolt 9, by which the drawer is locked when closed. This partition 7 may also support the stop 6 in position to interlock with the bolt 9, and thus limit the outward movement of the drawer when said bolt is raised. The stop 6 is preferably formed on one end of a metal strip 10, that may be attached to the upper edge of the partition 7 to protect it from wear by contact with the bolt 9 in the forward and back movements of the drawer.

Secured to the top of the base-section or drawer-casing 1 is a metal bed-plate 11, Figs. 3, 4, and 5, to which are attached suitable standards for supporting the operative mechanism of the cash register and indicator. To this bed-plate 11 is secured by fastenings 12, Fig. 4, a casing 13 for inclosing the greater part of the operative mechanism of the machine, and said casing, as shown in Figs. 2 and 4, may be provided with a hinged cover 14 to give access to its interior.

One end of the casing 13 is provided with an opening 15, Fig. 5, for reception of a rotary disk 16 having attached to its outer face a rotary dial 17, inscribed with a suitable arrangement of numerals to indicate consecutively by hundreds of dollars up to the total amount that the machine is capable of registering. This rotary dial 17 is almost wholly concealed by a stationary dial 18, having near its periphery an opening 19, through which the numerals on the rotary dial are consecutively displayed in position to be read in connection with two ciphers inscribed on the stationary dial 18, as shown in Fig. 2. The face of the stationary dial 18 may be graduated and marked with a suitable arrangement of numerals to indicate at the same time from one dollar to ninety-nine dollars and from one cent to one dollar. To point out dollars on the stationary dial 18, a movable index or dollar-pointer 20 is employed, and for indicating cents in the same manner a movable index or cent-pointer 21 is provided. For the purpose of protecting the dial 18 and its pointers a circular frame 22 may be secured to the end of the register-casing 13 and support a glass face 23, through which the totals of the indicator or adder can be observed. A swinging cover 24 may be attached to the frame 22, if desired.

By referring to Fig. 5 it will be observed that the cent-pointer 21 is secured to one end of a rotary shaft 25, that may be termed the "cent-shaft;" but if, as in the present instance, the gearing of the setting mechanism, hereinafter described, is constructed to set the machine for registering cents by increases of five or multiples thereof, which is frequently all that is required, the index 21 may be termed a "five-cent pointer," and the shaft 25 may be likewise termed "the five-cent shaft." For convenience of description, therefore, and in view of the obvious scope of the invention I shall not impose upon myself any limitation in the use of these terms, but shall employ both the above-mentioned designations of the pointer 21 and shaft 25 in the same sense. The inner end of this cent-shaft or five-cent shaft 25 is journaled in a suitable bearing provided in a standard 26, secured to the bed-plate of the machine. On the shaft 25 at or near its inner end is securely fastened a spur-pinion 27, meshing with an intermediate gear 28, that is loosely mounted on an arm 29 of the standard 26, as shown in Figs. 4 and 5. Through this intermediate gear 28 the pinion 27, shaft 25, and cent-pointer 21 are actuated from a spur-gear 30, fast on a sleeve 31, that is loosely mounted on a rock-shaft 32, supported in suitable bearings in standards 33 and 34, secured to the bed-plate. On the outer end of the loose sleeve 31 is formed or rigidly attached a ratchet-wheel 35 and a stop-wheel 36, Figs. 5, 6 and 7, that is of somewhat larger diameter than said ratchet-wheel. The ratchet-wheel 35, sleeve 31, and spur-gear 30 are actuated by means of a driving-pawl 37, Figs. 4, 6 and 7, that is adapted to engage the ratchet-wheel when moved in the proper direction by an oscillatory lever 38, to which said driving-pawl is pivotally connected. The oscillatory lever 38 is rigidly secured to the rock-shaft 32, which may be provided with a cranked handle 39, Fig. 1, through which said oscillatory lever 38, ratchet-wheel 35, and connected parts are operated.

On one side of the oscillatory lever 38 is pivoted a reversible double-acting pawl 40, having in its inner face two adjacent conical depressions or recesses 41, Fig. 8, to alternately engage a spring-catch 42, Fig. 9, carried in a recessed portion of the lever 38 for the purpose of automatically locking the pawl 40 in either one of its two positions slightly out of line with the longitudinal axis of said lever. In both positions of the reversible pawl 40 one or the other of its teeth 43 is adapted to engage and interlock with the toothed periphery of a stationary circular rack 44, Figs. 4 and 6, that is secured to the upper part of the standard 34, as shown in Figs. 3 and 5. By this engagement of the reversible pawl 40 and rack 44 the lever 38 is locked against a retrograde movement until it has completed its throw in one direction. Immediately below the circular rack 44 is a double-armed lever 45, Fig. 6, that is centrally fulcrumed on a stud which projects inward from the standard 34, as shown in Fig. 5. The opposite ends of this double-armed lever 45 are provided with adjustable vertically-projecting screws or lugs 46, and on the pivotal hub of the said lever is a vertically-projecting pin or stud 47, to be engaged on one side or the other by either one or two studs or pins 48, that project from opposite sides of the hub of the oscillatory lever 38, as shown in Figs. 3, 5, and 6. Before the throw of the lever 38 in either direction is commenced the undermost tooth 43 of the reversible pawl 40 will be in engagement with the circular rack 44, and will thus prevent any backward movement of the lever 38 and the driving-pawl 37 until the throw of the lever 38 is completed. Just before the lever 38 completes its throw the undermost stud 48 comes in contact with the stud 47, and thereby tilts the double-armed lever 45 in such a manner as to cause one of its lugs 46 to bear against the under side of the pawl 40 and reverse its position, one of its teeth, which is now uppermost, being thus disengaged from the circular rack 44, and the other tooth, which is now undermost, being engaged therewith. It will be observed that while the engagement of the conical-faced spring-catch 42 in one of the conical depressions or recesses 41 of the double-acting reversible pawl 40 is sufficient to hold the said pawl in an operative position it does not offer any obstruction to the reversal of the pawl under the pressure exerted by the lug or projection 46 on the double-armed reversing-lever 45, that is actuated as described.

During the throw of the cranked handle 39 and lever 38 in a forward direction toward the operator the driving-pawl 37 is in actuating engagement with the teeth of the ratchet-wheel 35, and consequently said ratchet-wheel, together with the sleeve 31 and spur-gear 30, will receive a rotary movement and will impart the same through the intermediate gear 28 and pinion 27 to the five-cent shaft 25 and its attached pointer. On completing the forward throw of the lever 38 its under side comes in contact with the upper end of a vertical stop-rod 49, that may have a slight endwise movement in guide-openings provided in brackets 50, projecting from the standard 34, as shown in Figs. 3 and 4. The lower end of this stop-rod 49 is supported on a vertically-adjustable screw 51, held in one end of a lever 52, fulcrumed at 53 on an arm 54 of the standard 34, as shown in Figs. 3 and 6. To the other end of the lever 52 is loosely connected a vertically-projecting pin 55, that is supported in a guide-lug 56, projecting from the inner face of the standard 34, as shown in Fig. 5. The upper end of the pin 55 is provided with a double bevel for engagement with the serrated or V-shaped teeth of the stop-wheel 36, as shown in Figs. 5, 6, and 7. By reason of the form of the teeth on the stop-wheel 36 and the double inclined beveled end of the pin 55 the light engagement that normally exists between said parts will not obstruct the rotation of the stop-wheel, together with the ratchet-wheel 35, until the lever 38 completes its forward throw and slightly depresses the stop-rod 49; but at that instant the downward movement of the rod 49 will slightly rock the lever 52, and thereby throw the pin 55 into firm engagement with the serrated periphery of the stop-wheel 36, so as to cause said pin to serve as a detent or instantaneous stop for the wheel 36, ratchet-wheel 35, and the gearing that connects with the register mechanism.

As a means of retarding the rotation of the spur-gear 30 and connected ratchet-wheel 35 to obviate the effects of momentum, a friction-wheel 57, Figs. 4 and 5, may be rigidly mounted on the rotary sleeve 31, that connects said ratchet-wheel and spur-gear. This friction-wheel 57 is preferably provided with a grooved periphery for contact with a friction-block 58, of suitable material, adjustably supported in an overhanging portion of the standard 26, as shown in Fig. 5.

On the loose rotary sleeve 31, adjacent to the ratchet-wheel 35, is loosely mounted a spur-gear 59, having secured thereto a cam 60 on the side next to the ratchet-wheel. This spur-gear and cam are parts of a setting mechanism, presently described, for determining the point at which the driving-pawl 37 should engage the ratchet-wheel 35 in order to move the five-cent shaft 25 and its pointer 21 the distance required. On one side of the pawl 37 is a guide-pin 61, Fig. 4, to engage and travel on the cam-surface, and to the other side of the pawl is connected one end of a spring 62, Figs. 4, 6, and 7, that has its other end attached to the oscillatory pawl-carrying lever 38 and serves to hold the pawl to its engagement with the ratchet-wheel at the point determined by the position of the cam. In the operation of setting or adjusting the cam 60 its attached gear 59 is actuated through a spur-gear 63 on one end of a shaft 64, journaled in suitable bearings at the upper end of a standard 65, Figs. 3, 4, and 6. On the shaft 64 is secured a miter-gear 66, Fig. 4, meshing with a miter-gear 67 on the inner end of a shaft 68, mounted in the top of the standard 65 at right angles to the shaft 64 and provided on its outer end outside the register-casing 13 with a handle 69, Figs. 1 and 4, by means of which the shaft 68 can be rotated in either direction to actuate the connected gearing for setting the cam 60 and driving-pawl 37 in such position that the register mechanism when operated will be moved only to the extent required for registering the desired amount. In order to hold this setting mechanism in the position to which it may have been adjusted, a serrated stop-wheel 70 is rigidly mounted on the shaft 68 in engagement with the upper doubly-beveled end of a vertically-movable spring-latch 71, that works in guides 72 on the outside of the standard 65, as shown in Figs. 3 and 6. A spring 73, having its lower end attached to the latch 71 and its upper end attached to the standard 65, serves to hold the upper beveled end of said latch in engagement with the periphery of the serrated stop-wheel 70 with sufficient force to prevent rotation of the shaft 68 and connected gearing, except when intentionally actuated through the handle 69 for the purpose of adjusting the setting mechanism of the cent-register as may be required. In connection with this setting mechanism I prefer to employ a rotary dial 74, Fig. 1, graduated to indicate amounts from five cents to one dollar.

The rotary dial 74 is carried by a hub or disk 75, secured to the shaft 68, as shown in Fig. 4. Attached to the register-casing 13 in front of the rotary dial 74 is a stationary plate 76, having an opening 74$^a$, through which only a limited number of numerals on the rotary dial can be observed at once, as shown in Fig. 1, and at the bottom of this opening preferably is arranged a stationary index or pointer 77 to designate the point to which the required numeral on the rotary dial must be brought in order to properly set the machine for registering the corresponding amount.

For the purpose of providing a stop to limit the adjustment of the setting mechanism in either direction corresponding with the lowest amount and the highest amount on the setting-dial 74 a stud 78 may be conveniently arranged on the hub of the spur-gear 63 to contact with a stop-lug 79, that is pivoted to the standard 65 and provided with a slot 80, engaging a pin 81 on said standard, as shown in Fig. 6, whereby the lug 79 is permitted to yield sufficiently to prevent shock or jar when struck in either direction.

On the five-cent shaft 25, between the standard 26 and the pinion 27, is a collar or filling-piece 82, Fig. 5, to prevent endwise movement of said shaft. Secured to this shaft 25 on the other side of the pinion 27 is a cam 83, the enlarged surface of which normally presses down a vertically-projecting arm or lug 84, secured to a horizontal lever 85, one end of which is pivotally attached to a standard 86, as shown in Fig. 10. The other end of the lever 85 is connected by a link 87 to a pawl-carrying lever 88, that has one end fulcrumed on the five-cent shaft 25, as shown in Fig. 5, while its other end is suspended by means of a spiral spring 89 from the upper part of a post or standard 90, as shown in Fig. 10. A pawl 91, carried by the lever 88, is held by a spring 92 in engagement with a ratchet-wheel 93, that is rigidly secured, as shown in Fig. 5, to the inner end of a sleeve or tubular dollar-shaft 94, which surrounds the greater part of the cent-shaft 25, and which carries the dollar-pointer 20 on its outer end. The ratchet-wheel 93 is provided with one hundred teeth and is actuated intermittingly through the cam 83, pawl 91, and their intermediate connections in such a manner that when the number of cents to be registered amounts to a dollar or to more than a dollar through addition to the cents already registered the dollar-shaft 94 will be rotated a sufficient distance to carry the dollar-pointer 20 forward the space of one dollar on the stationary dial 18, previously described. It will be seen that at each complete revolution of the cam 83 when its depressed or contracted portion comes in contact with the upper beveled end of the arm or lug 84 on the lever 85 the extended spring 89 will be permitted to exert its force or tension in raising the connected levers 85 and 88, and the pawl 91, carried by said lever 88, will be made to move the ratchet-wheel 93 the space of one tooth, so as to rotate the sleeve or tubular shaft 94 a sufficient distance to cause the pointer 20 to register an additional dollar. In order to provide a friction-brake for retarding the movement of the ratchet-wheel 93 and preventing an excessive rotation thereof under the impulse imparted by the pawl 91, friction-blocks 95, Figs. 3 and 4, may be supported on opposite sides of said ratchet-wheel by means of vertical elastic bars 96, that can be adjustably clamped to one side of the standard 86, as shown in Figs. 3 and 10.

To the inner end of the rock-shaft 32 is secured a spur-pinion 97, Figs. 3, 4, 5, and 11, for imparting movement to a spur-gear 98, loosely mounted on the dollar-shaft 94, as shown in Fig. 5. Fulcrumed on the dollar-shaft 94 and bolted to the spur-gear 98, so as to be actuated therefrom, is an oscillatory pawl-carrying lever 99, to which is pivoted a pawl 100, Figs. 11 and 12, for driving a ratchet-wheel 101, that is fastened to a serrated stop-wheel 102, the hub of which is secured to the dollar-shaft 94, as shown in Fig. 5. To the pawl 100 is attached one end of a spring 103, the other end of which is fastened to the oscillatory lever 99, and one side of said pawl is provided with a laterally-projecting guide pin or stud 104, Fig. 12, to engage and travel on a cam 105, Fig. 11, secured to a spur-gear 106, that is loosely mounted on the hub of the stop-wheel 102, where it is held in place by a collar 106$^a$, as shown in Fig. 5.

The mechanism for setting the cam 105 to control the engagement of the driving-pawl 100 with the ratchet-wheel 101 comprises, besides the spur-gear 106, an intermediate gear 107, journaled on a stud supported by a bracket 108, that projects from the upper part of a standard 109, secured to the bed-plate of the machine. This intermediate gear 107 meshes on one hand with the spur-gear 106, on which the cam 105 is secured or formed, and on the other hand with a pinion 110, that is fast on a shaft 111, journaled in the brackets 108, as shown in Fig. 4. On this shaft 111 is fastened a miter-gear 112, meshing with a miter-gear 113 on the inner end of a shaft 114, supported in the upper part of the standard 109 and at right angles to the shaft 111, on which the gears 110 and 112 are mounted. The outer end of the shaft 114 has secured thereto a handle 115, Figs. 1 and 4, by means of which the shaft 114 can be wholly or partly rotated in either direction to actuate the connected gearing, and thereby set the cam 105 in the required position for controlling the amount of dollars to be registered when the dollar-shaft 94 is actuated from the lever 99, pawl 100, and ratchet-wheel 101 in registering at one operation an amount involving several dollars. By means of the handle 115, also, the cam 105 can be so adjusted or set as to hold the pawl 100 out of operative contact with the ratchet-wheel 101 at all times or when it is desired to employ the machine only for registering amounts of one dollar or less. On the shaft 114 is secured a hub or disk 116, Fig. 4, carrying a rotary dial 117, graduated to indicate dollars from "1" to "24," or any other desired amount, according to the required capacity of a machine for registering a large amount at one operation. The stationary plate 76, Fig. 1, before referred to, may be extended in front of the rotary dial 117 and have an opening 117$^a$ in its upper part, through which one of the numbers on the rotary dial can be observed. This stationary dial-plate 76 may be also provided with a series of numbers corresponding with those on the rotary dial 117, and, as shown in Fig. 1, a movable index or pointer 118, carried on a hub or collar 119, secured to the rotary shaft 114, will serve to indicate the extent of rotation in either direction to be imparted to said shaft by means of the handle 115 for the purpose of properly setting the machine to register the required number of dollars. When this pointer 118 is turned to zero or a point midway between the highest and lowest numbers on the stationary dial 76, it will be known that the setting mechanism is so adjusted as to throw the dollar-registering devices out of operation. Amounts of one dollar can still, however, be registered by the cent-registering mechanism when set to its full capacity. For the sake of compactness the rotary dials 74 and 117 may be arranged in such a manner as to lap by each other, one being supported slightly in advance of the other, as shown in Fig. 4, and the plate 76, as shown in Fig. 1, may be formed as a twin dial.

On the shaft 114 is secured a serrated stop-wheel 120, Figs. 4 and 11, to engage a vertically-movable spring-latch 121, Figs. 3 and 11, supported in guides 122 and provided with a spring 123, of sufficient strength to normally cause the said stop-wheel and latch to hold the dollar-setting mechanism in the position to which it may have been turned or adjusted. Projecting from one side of the vertically-movable spring-latch 121 is a beveled nose or lug 124, Fig. 3, with the upper edge of which is engaged a pin or stud 125, carried on the upper end of a rocking lever or trip 126, that is pivotally supported on the standard 109, to which the guides 122 of the spring-latch 121 are also attached. The trip-lever 126 carries near its lower end a small friction-roller 127 for contact with the beveled end of one arm of a V-shaped lever 128, that is fulcrumed to a short standard 129, as shown in Fig. 3. To the other arm of this lever 128, is pivotally connected one end of a link 130, Fig. 3, that has its other end pivotally attached to a swinging arm 131, which is pivotally supported at its upper end on a pin or stud 132, carried by the vertically-movable spring-latch 71 of the setting mechanism for the cent-registering devices, the said pin or stud being extended through a vertical slot in the upper guide 72 of the spring-latch 71, as indicated by dotted lines in Fig. 6. The lower end of the swinging arm 131 is inclined or beveled, as shown in Fig. 3, and normally rests on a small friction-roller 133, attached to the lower guide of the vertically-movable spring-latch 71, so that when the shaft 68 is turned in setting the cent-registering mechanism for any desired operation, the movement of the serrated wheel 70, forcing the spring-latch 71 and attached arm 131 downward, will cause the lower beveled end of said arm 131 to slip off from the roller 133, thereby imparting to the arm 131 a swinging movement, that is transmitted through the link 130 and lever 128 to the trip 126 in such manner as to cause its pin or stud 125 to ride inward and upward on the upper beveled or inclined edge of the nose 124, and thereby draw down the vertically-movable latch 121 and momentarily disengage it from the serrated wheel 120 on the shaft 114 of the dollar-setting mechanism. This momentary disengagement of the spring-latch 121 from the serrated wheel 120 enables the setting mechanism of the dollar-registering devices to be automatically set to zero or thrown out of action by means of a recoil mechanism comprising a strong spiral spring 134, Fig. 11, inclosed in an inclined tubular casing 135 and surrounding a reciprocating rod or plunger 136, one end of which is connected by a chain 137 to a lug or projection 138 on one side of the spur-gear 106, as shown in Figs. 3 and 4. By reference to Fig. 11 it will be seen that the inner end of the rod or plunger 136 is provided with a bearing 139 for one end of the spiral spring 134, the other end of which bears against the inner face of the head of the casing or cylinder 135, through which the rod 136 projects. The casing or cylinder 135 is preferably secured to the bed-plate 11 in an inclined position, as shown. The chain 137 is passed beneath and against the hub of the spur-gear 106, and thence to the lug 138, to which one end is secured. In rotating the gear 106 to set the cam 105 in position for causing the pawl 100 to engage the ratchet-wheel 101 at the proper point to effect at one operation of the machine a registration of any required number of dollars the chain 137 will be made to draw the rod 136 outward, and thereby compress the spring 134 to store sufficient power for automatically throwing the setting mechanism of the dollar-registering devices to zero, when the cent-registering devices are again set for action. For this reason in operating the machine to register both dollars and cents at one operation of the cranked handle 39 it is necessary that the driving mechanism of the cent or five-cent registering devices should be first set by means of the handle 69, after which by means of the handle 115 the driving mechanism of the dollar-registering devices can also be set as required; but if the driving mechanism of the dollar-registering devices should be first set any manipulation of the handle 69 on the shaft 68 sufficient to move the wheel 70 one tooth would momentarily force down the spring-latch 71; and through its connections with the trip-lever 126, as already described, the wheel 120 and latch 121 would be momentarily disengaged, and the spring 134, acting through the rod 136 and chain 137, would immediately throw the setting mechanism of the dollar-registering devices to a point where they would cease to be operative. This inoperative position of the dollar-setting mechanism does not, however, interfere with operation of the setting mechanism actuated through the handle 69 for setting the cam 60 to effect a registration of amounts of one dollar or less at one operation, as previously described.

As shown in Fig. 4, a stud 140 may be arranged on the shaft 111 to contact with a slightly-yielding stop-lug 141, supported on one of the brackets 108 to limit the adjustment of the adjacent setting mechanism in either direction, corresponding on the one hand with the zero-mark and on the other hand with the highest amount on the rotary dial 117, Figs. 1 and 4. Inasmuch as the construction, operation, and purpose of the stop-lug 141 is the same as the stop-lug 79, already described, a further explanation thereof is deemed unnecessary. For the purpose of preventing any shock or jar from forcible contact of the stud 140 with the stop-lug 141 under the quick action of the spring 134 and chain 137 in automatically returning the setting mechanism of the dollar-registering devices to zero a pivotally supported stop-arm 142 is attached to the standard 109, as shown in Fig. 3. This swinging stop-arm 142 is suspended in the path of the trip-lever 126 and has its lower end extended laterally toward said trip-lever, as shown, so as to be struck by the trip-lever, and thereby swung outward or laterally when the trip-lever is actuated, as hereinbefore described. The upper end of the swinging stop-lever 142 is provided with a beveled projection 143, that is extended laterally toward a disk 144, which is fast on the shaft 114, and provided at the proper point with a beveled tooth 145 for a momentary contact with the beveled projection 143 that will be just sufficient to retard the rotation of the geared shafts 114 and 111 when near the end of their revolutions under the action of the spring 134, and so prevent a forcible contact of the stud 140 and yielding stop-lug 141, and thus obviate jar and strain.

When the devices for registering several dollars at one operation of the cranked handle 39 are set for action by means of the setting-handle 115, the pawl 100 will engage the ratchet-wheel 101 at a point determined by the position to which the cam 105 has been set, as indicated by the pointer 118, in connection with the numerals on the stationary dial-plate 76, Fig. 1. The oscillatory pawl-carrying lever 99 is moved forward on the backward throw of the cranked operating-handle 39, and just as this lever 99 completes its forward movement it comes in contact with and depresses a vertical stop-rod 146, supported in guide-brackets 147, projecting from the standard 33, as shown in Fig. 3. This stop-rod 146 bears at its lower end on a screw 148, carried by one end of a rocking lever 149, fulcrumed at 150, Fig. 11, and carrying at its other end a vertically-projecting pin 151, that is supported in a guide-bracket 152 and provided with a beveled upper end to engage the serrated stop-wheel 102, and thus prevent too great a movement of the ratchet-wheel 101 and dollar-shaft 94 from momentum, the operation being the same as that of the stop-rod 49 and vertically-movable pin or detent 55, already described.

To the tubular dollar-shaft 94 is secured a cam 153, Figs. 3, 4, 5, and 13, the periphery of which is in bearing contact with a vertically-projecting arm or lug 154, fastened to a horizontal lever 155, one end of which is pivoted to an arm 156 of a standard 157, secured to the bed-plate 11 near one end of the machine. The other end of the lever 155 is connected by a link 158 to a pawl-carrying lever 159, one end of which is fulcrumed on the dollar-shaft 94, as shown in Fig. 5. To the other end of the pawl-carrying lever 159 is attached a spiral spring 160, by which it is suspended from the upper part of a standard 161, as shown in Figs. 3, 5, and 13. A driving-pawl 162, carried by the lever 159, is held by a spring 163 in engagement with a ratchet-wheel 164, that is loosely mounted on the dollar-shaft 94, as shown in Fig. 5. Attached to or formed on the ratchet-wheel 164 is a serrated stop-wheel 165 of somewhat larger diameter than said ratchet-wheel. In an overhanging portion of the standard 157 is arranged a vertically-yielding stop-pin or detent 166, to the upper projecting end of which is attached one end of a spiral spring 167, that has its lower end secured to one side of said standard. The force exerted by this spring 167, acting on the yielding detent 166 and holding its lower beveled end in engagement with the serrated wheel 165, is just sufficient to retard the rotation of the ratchet-wheel 164 and prevent a too great movement thereof when actuated by the driving-pawl. By reference to Fig. 5 it will be observed that the connected ratchet-wheel 164 and serrated stop-wheel 165 are provided with an elongated hub 168, that is journaled or mounted in a bearing formed in the standard 157 and in turn supports the outer ends of the concentrically-arranged dollar and cent shafts hereinbefore mentioned. On a reduced portion of this elongated wheel-hub 168 is securely mounted the hub of the rotary disk 16, to which is attached the rotary dial 17 for indicating hundreds of dollars, as before described. In a machine constructed to register a total amount of five thousand dollars the ratchet-wheel 164 will be provided with fifty teeth and the rotary dial 17 will be graduated to indicate five thousand.

It is obvious that to vary the capacity of the machine it is only necessary to increase or diminish the number of teeth on the ratchet-wheel 164 and make a corresponding change in the graduations of the connected rotary dial. At the end of each complete revolution of the dollar-shaft 94 the depressed or contracted portion of the cam 153, Fig. 13, will come in contact with the upper beveled end of the arm or lug 154 on the lever 155 and permit said lug to rise under the contraction of the spring 160, which at the same time raises the pawl-carrying lever 159 and, through the attached driving-pawl 162, imparts an impulse that moves the ratchet-wheel 164 the space of one tooth. The force thus exerted by the tension of the spring 160 is sufficient to cause the pin or detent 166 to yield and permit a step-by-step movement of the ratchet-wheel 164 and stop-wheel 165 or one tooth of the ratchet-wheel at each complete revolution of the dollar-shaft 94; but by reason of the spring 167, acting on the detent 166 and serrated wheel 165, a greater movement of the ratchet-wheel 164 or more than one tooth at a time will be prevented. It will thus be understood that at the end of each complete revolution of the dollar-shaft 94 the rotary dial 17 will be moved forward one space or sufficiently to indicate an additional hundred dollars through the opening 19 in the outer stationary dial 18 of the total-adder, as already described. It is also obvious that the odd dollars and cents or fractions of dollars will be at the same time clearly indicated by the positions of the dollar-pointer 20 and cent-pointer 21, Fig. 2, with relation to the graduations on the stationary dial.

After the machine has been properly set by means of either or both of the setting-handles 69 and 115, according to the amount of cash to be registered, the registration of the amount will be effected by giving a forward movement to the rock-shaft 32, through which the several registering devices are actuated in the manner already described.

When the rock-shaft 32 is turned backward, the oscillatory pawl-carrying lever 38 in swinging backward is brought into engagement with and forces back the upper end of a lever 169, Figs. 6 and 14, that is fulcrumed to an arm 170, projecting rearward from the standard 34. By means of a spring 171 this lever 169 is normally held in position to be acted on by the pawl-carrying lever 38, and when the lever 38 makes another forward throw the said spring 171 will return the lever 169 to its normally-vertical position. To the lower end of the lever 169 is hinged a lug 172, that is beveled on its under side, and, as shown in Fig. 15, is so constructed and arranged as to be capable of yielding in only one direction. When the upper end of the lever 169 is forced backward, as above described, the hinged lug 172 is carried above and in forcible or rigid contact with a pin or stud 173, projecting from one side of a lever 174, the forward end of which is fulcrumed to a block or support 175, Fig. 6. The lever 174 is connected to one end of a lever 176, fulcrumed in bearings 177, Fig. 3, and having its other end bifurcated to connect with and support the vertically-movable drawer-locking bolt 9, heretofore referred to. As shown in Figs. 3 and 16, this locking-bolt 9 is extended down through a tubular casing or guide 178, that may be formed on or suitably attached to the bed-plate 11 of the machine. The bolt 9 is normally forced downward by means of a surrounding spiral spring 179, Fig. 16, having a bearing at one end on a shouldered portion of said bolt and at its other end on a bushing 180, screwed into the bolt-casing. When by the operation of the machine the lug 172 on the lower end of the lever 169 is carried forward and in forcible contact with the upper side of the stud 173 on the lever 174, thereby forcing its free end downward, the connected lever 176 will be tilted sufficiently to raise the spring locking-bolt 9 from its engagement with the recess 8 of the cash-drawer 2, and at that instant by the action of the spring 3 the said drawer will be automatically thrown open to give access to its contents. The forward movement of the lower end of the lever 169 also causes its attached lug 172 to tilt a short lever 181, Fig. 14, fulcrumed at 182, Fig. 5. By the action of a spring 183, Fig. 14, connected with the lever 181, a hammer 184, carried by said lever, is caused to sound an alarm on a gong 185, Figs. 4 and 5, just as the lug 172 and lever 181 become disengaged and at the instant that the drawer 2 is thrown open.

The bolt-carrying lever 176 is provided on one side with an arm 186, Figs. 4 and 14, to which is centrally pivoted a horizontal locking-bar 187, the ends of which occupy positions below the lower ends of the vertically-movable spring latch-bars 71 and 121, that are engaged with the serrated stop-wheels 70 and 120 of the setting mechanism. When the cash-drawer 2 is automatically unlocked and thrown open, as above described, the lever 176 carries the bar 187 against the lower ends of the latches 71 and 121, and by the opening of the drawer the upper edge of its partition 7 passes beneath and supports the bolt 9 against the tension of its spring 179, so that as long as the drawer and bolt maintain this relation to each other the firm engagement of the latches 71 and 121 with the stop-wheels 70 and 120 under the upward pressure of the bar 187 against the lower ends of said latches will prevent any manipulation of the setting mechanism, and the said mechanism will thus remain locked until the drawer 2 is closed.

To a lug 188, Fig. 6, projecting rearward from the standard 34, is fulcrumed a locking-lever 189, having at its upper end a notch or catch 190 to engage a locking lug or projection 191 on the oscillatory pawl-carrying lever 38, and thus prevent a further operation of the registering devices when said lever completes its rearward throw and the cash-drawer is opened. Near the upper end of this locking-lever 189 is attached one end of a spiral spring 192, the other end of which is secured to the standard 34 or other fixed point. The lower end of the lever 189 is inclined or beveled for contact with a pin or stud 193, projecting from one side of the free end of the lever 174, as shown in Fig. 14. When the cash-drawer 2 is closed and locked by the bolt 9, the elevated position of the free end of the lever 174 causes its pin or stud 193 to bear against the upper portion of the inclined or beveled end 194 of the lever 189, thereby throwing and holding the upper end of said lever backward and extending its spring 192; but when the hinged lug 172 is swung forward to bear on the stud 173 of the lever 174 and force its free end downward in the act of unlocking the drawer 2 the stud 193 will ride along the incline 194 toward its lower end, and will thus permit the spring 192 to draw the upper end of the locking-lever 189 forward and engage its catch 190 with the lug 191 on the pawl-carrying lever 38, which, being rigid on the rock-shaft 32, will prevent any further operation of the machine through the cranked handle 39 until the cash-drawer is again closed. At the instant that the cash-drawer is closed against the tension of its spring 3 the stud 193, riding upward along the incline 194 of the locking-lever 189, will disengage said lever from the pawl-carrying lever 38, and the descent of the spring-bolt 9 into engagement with the drawer-recess 8 will relieve the latches 71 and 121 from the locking-pressure of the bar 187, thereby restoring both the registering devices and their setting mechanism to operative condition. In the next operation of the machine, when the forward movement of the pawl-carrying lever 38 releases the lever 169, and thus enables the spring 171 to draw the upper end of said lever 169 forward and carry its lower end backward, the yielding of the hinged lug 172, as shown in Fig. 15, will prevent it from exerting any action on the levers 174 and 181, and thus it will be seen that the drawer 2 and gong 185 are only operated when the lever 38 completes its rearward throw after the registering devices have been actuated.

The machine illustrated in Figs. 1 to 16 may be arranged, as shown, to register at one operation any amount from five cents to twenty-five dollars, it being only necessary to first properly set the rotary cent-dial 74 with relation to the fixed pointer 77, Fig. 1, by means of the setting-handle 69, then set the rotary dial 117 and pointer 118 by means of the setting-handle 115, if several dollars are included in the amount to be registered, and then throw the cranked register-operating handle 39 forward and backward once, whereupon the desired amount will be registered on the dial 18 at the end of the register-casing, the cash-drawer 2 will be automatically unlocked and thrown open simultaneously with the sounding of an alarm on the gong 185, and the machine will be automatically locked against further manipulation until the cash-drawer is again closed. It is obvious that by suitable changes in the graduations of the several dials and by increasing the number of teeth in the wheels of the registering mechanism the machine can be made to register at one operation any amount from one cent to more than twenty-five dollars without involving any departure from the principle of my invention. In registering amounts of one dollar or less the registering mechanism controlled by the setting mechanism that is directly connected with the setting-handle 115 will be thrown out of operation. It is therefore obvious that in machines designed only for registering such small amounts the rock-shaft 32 will not be connected with the dollar-shaft 94 through a pinion 97 and gear 98; but said pinion and gear, together with the pawl-carrying lever 99, gears 101 102, cam 105, and the accompanying setting mechanism hereinbefore described, will be dispensed with. A machine of this description for registering amounts of one dollar and under is illustrated in Figs. 17 and 18.

By referring to Fig. 18 and comparing the same with Fig. 4 it will be seen that the modified machine for registering amounts of one dollar and less comprises all the parts of the cent or five-cent registering mechanism actuated from the rock-shaft 32 through the pawl-carrying lever 38, ratchet-wheel 35, and gears 30, 28, and 27, as hereinbefore described. It also comprises the cam 60 on the gear 59 and the mechanism for setting the said cam to control the engagement of the pawl 37 with the ratchet-wheel 35, according to the amount to be registered. It further comprises the cam 83 on the five-cent shaft 25 and accompanying mechanism connecting with the gear 93 on the dollar-shaft 94, through which said dollar-shaft is actuated at the completion of each revolution of the five-cent shaft, as already explained. In this modified form of machine I prefer to provide the setting mechanism with a rotary dial 74, Fig. 17, suitably graduated and adapted to display the required amount through an opening 74$^a$ in a fixed dial-plate 76, the shaft of the setting-handle 69 being provided with a pointer 69$^a$ to indicate, in connection with a series of numbers on the fixed dial 76, the point to which the setting mechanism must be turned in order to register a corresponding amount. It is obvious, however, that instead of employing a movable pointer 69$^a$, I may dispense with all numerals on the fixed dial-plate 76 and use the fixed pointer 77 (shown in Fig. 1) in connection with an enlarged opening in the stationary dial-plate.

For convenience and quickness in operating the machine and to relieve the operator of the necessity of throwing the cranked handle 39 backward after it has been drawn forward to actuate the register devices a peripherally-grooved wheel or disk 195 may be secured to the rock-shaft 32 and connected by a chain 196 with a recoil mechanism comprising a spring-plunger 197, inclosed in a tubular casing 198, as shown in Fig. 18. The construction and arrangement of the spring-plunger 197 is the same as that of the spring-plunger 136, Fig. 11, hereinbefore described. As this spring-plunger 197 will exert sufficient force to rotate the rock-shaft 32 backward, thereby actuating the mechanism to unlock the cash-drawer 2 and permit it to fly open, the operator or salesman can immediately release the cranked handle 39 as soon as he has drawn it forward, and thus be in readiness to make change quickly. Although I have shown this recoil mechanism for the rock-shaft only in connection with the machine illustrated in Fig. 18, it is obvious that it can be attached to both machines.

It will be observed by reference to Figs. 1 and 17 that when the machine is set for operation the amount to be registered is displayed on the rotary dials 74 and 117 in position to be read. These dials project above the casing of the machine, as shown in Fig. 2, and may be so arranged as to be conveniently read by both the salesman and the purchaser, it being only necessary to correspondingly graduate the rotary dial or dials on both sides and provide suitable openings on both sides of the casing, through which the desired amount can be displayed.

What I claim as my invention is—

1. In a cash-register, the combination, with a register mechanism and a rock-shaft provided with a lever for actuating said register mechanism, of a cash-drawer, a spring locking-bolt for said drawer, a series of levers actuated from the levers on the rock-shaft of the register mechanism to automatically disengage said bolt and release the drawer after an amount has been registered, and a locking-lever adapted to be released by one of the bolt-actuating levers in the operation of automatically unlocking and opening the drawer, whereby said locking-lever is permitted to engage the lever on the rock-shaft of the register mechanism and lock said register mechanism against further operation until the cash-drawer is again closed and locked, substantially as described.

2. In a cash-register, the combination, with a register mechanism and a rock-shaft provided with a lever for actuating said register mechanism, of a cash-drawer, a bolt for automatically locking said drawer when closed, a series of levers actuated from the lever on the rock-shaft of the register mechanism to automatically disengage said bolt and release the drawer after an amount has been registered, a locking-lever adapted to be released by one of the bolt-actuating levers in the operation of automatically unlocking the drawer, and a spring for causing the said released locking-lever to engage the lever on the rock-shaft of the register mechanism, and thereby lock said register mechanism against further operation until the cash-drawer is again closed and locked, substantially as described.

3. In a cash-register, the combination, with a register mechanism provided with an actuating rock-shaft, of a cash-drawer, a bolt for automatically locking said drawer when closed, a series of levers actuated from the said rock-shaft to automatically disengage the bolt and release the drawer after an amount has been registered, and an alarm operated by one of the bolt-actuating levers in the operation of automatically unlocking the drawer, substantially as described.

4. In a cash-register, the combination, with a register mechanism and a rock-shaft provided with a lever for actuating said register mechanism, of a cash-drawer, a bolt for automatically locking said drawer when closed, a series of levers actuated from the lever on said rock-shaft to automatically disengage the bolt and release the drawer after an amount has been registered, an alarm operated by one of the series of bolt-actuating levers in the operation of unlocking the drawer, and a locking-lever adapted to be automatically engaged with the lever on the rock-shaft of the register mechanism simultaneously with the sounding of the alarm to lock said register mechanism against further operation until the cash-drawer is again closed and automatically locked, substantially as described.

5. In a cash-register, the combination of a register mechanism provided with an actuating rock-shaft, a setting mechanism for the register devices, a locking-wheel on a rotary shaft of the setting mechanism, a vertically-movable spring-latch in yielding engagement with the under side of said locking-wheel, an automatically-opening cash-drawer, a vertically-movable spring-bolt for automatically locking said drawer when closed, a series of levers actuated from the rock-shaft of the register mechanism to automatically disengage said bolt and release the drawer after an amount has been registered, and a locking-bar carried by one of the series of bolt-actuating levers and adapted to bear upward against the lower end of the vertically-movable spring-latch to hold said latch in rigid engagement with the locking-wheel on the shaft of the setting mechanism, and thereby lock said setting mechanism against movement in either direction until the cash-drawer is closed and automatically locked, substantially as described.

6. In a cash-register, the combination of a register mechanism, a rock-shaft provided with a lever for actuating said register mechanism, a setting mechanism for controlling the amount to be registered, a locking-wheel on a rotary actuating-shaft of the setting mechanism, a spring-latch in yielding engagement with said locking-wheel, an automatically-opening cash-drawer, a spring-bolt for automatically locking said drawer when closed, a series of levers actuated from the lever on the rock-shaft of the register mechanism to automatically disengage said bolt and release the drawer after an amount has been registered, a locking-bar carried by one of the series of bolt-actuating levers and adapted to engage the spring-latch and hold it in rigid engagement with the locking-wheel on the actuating-shaft of the setting mechanism, and a spring locking-lever adapted to be automatically engaged with the lever on the rock-shaft of the register-operating mechanism simultaneously with the unlocking and opening of the drawer, whereby the register mechanism and its setting mechanism are locked against further operation until the said drawer is again closed and locked, substantially as described.

7. In a cash-register, the combination of a register mechanism, a rock-shaft provided with a lever for actuating said register mechanism, a setting mechanism for controlling the amount to be registered, an operating-handle for the setting mechanism, a rotary dial actuated from the handle of the setting mechanism to indicate and display the amount to be registered, a locking-wheel for the setting mechanism, a spring-latch in yielding engagement with said locking-wheel, an automatically-opening cash-drawer, a spring-bolt for automatically locking said drawer when closed, a series of levers actuated from the lever on the rock-shaft of the register mechanism to automatically disengage said bolt and release the drawer after an amount has been registered, a locking device carried by one of the series of bolt-actuating levers and adapted to engage the spring-latch and hold it in locking engagement with the locking-wheel of the setting mechanism, a locking-lever adapted to be automatically engaged with the lever on the rock-shaft of the register mechanism in the operation of automatically unlocking and opening the cash-drawer, and an alarm, substantially as described.

8. In a cash-register, the combination of a register mechanism, a rock-shaft provided with an operating-handle and carrying a lever for actuating the gearing of said register mechanism, a setting mechanism for controlling the extent of operation to be imparted to the register mechanism according to the amount to be registered, an operating-handle for the setting mechanism, a rotary dial actuated from the handle of the setting mechanism to indicate and display the amount to be registered, an automatically-opening cash-drawer, a bolt for automatically locking said drawer when closed, a series of levers actuated from the lever on the rock-shaft of the register mechanism to automatically disengage said bolt and release the drawer after the register mechanism has been operated, an alarm actuated from one of said levers simultaneously with the automatic unlocking and opening of said drawer, and automatically-actuated devices for locking the register mechanism and setting mechanism until the cash-drawer is again closed and automatically locked, substantially as described.

9. In a cash-register, the combination of an automatically-opening cash-drawer having a stop to limit its outward movement, a vertically-movable spring-bolt for automatically locking said drawer, a register mechanism provided with an actuating rock-shaft, a series of levers actuated from said rock-shaft to automatically disengage said bolt and release the drawer after the register mechanism has been operated, and automatically-actuated locking mechanism for locking the register mechanism against further operation until the cash-drawer is again closed and locked, substantially as described.

10. In a cash-register, the combination of a register mechanism, a rock-shaft provided with operating means, pawl-and-ratchet gearing operated from said rock-shaft to actuate the register mechanism, a setting mechanism for controlling the extent of operation to be imparted to the register mechanism according to the amount to be registered, an operating-handle for the setting mechanism, a rotary dial actuated from the handle of the setting mechanism to indicate and display the amount to be registered, an automatically-opening cash-drawer having a stop to limit its outward movement, a vertically-movable spring-bolt for automatically locking said drawer, a series of levers actuated from the rock-shaft of the register mechanism to automatically disengage said bolt and release the drawer after the register mechanism has been operated, and automatically-actuated devices for locking the register mechanism and the setting mechanism against further operation until the drawer is again closed and locked, substantially as described.

11. In a cash-register, the combination of a register mechanism, a rock-shaft provided with operating means, gearing operated from said rock-shaft to actuate the register mechanism when the rock-shaft is turned in one direction, an automatically-opening cash-drawer, a spring-bolt for automatically locking said drawer, a series of levers actuated from the rock-shaft to automatically disengage the said bolt and release the drawer after the register mechanism has been operated, a recoil mechanism for automatically turning the rock-shaft backward when released, and automatically-actuated locking mechanism for locking the register mechanism against further operation until the cash-drawer is again closed and locked, substantially as described.

12. In a cash-register, the combination of a register mechanism, a rock-shaft provided with operating means, a sleeve loosely mounted on said rock-shaft and provided with a spur-gear and ratchet-wheel, gearing to connect said spur-gear with the register mechanism, an oscillatory lever secured to said rock-shaft and carrying a driving-pawl to actuate said ratchet-wheel and connected spur-gear, and a setting mechanism comprising an adjustable cam to control the engagement of the pawl with the ratchet-wheel according to the extent of movement to be imparted to the register mechanism, substantially as described.

13. In a cash-register, the combination of a register mechanism, a rock-shaft provided with operating means, a sleeve loosely mounted on said rock-shaft and provided with a spur-gear, ratchet-wheel, and serrated stop-wheel, gearing to connect said spur-gear with the register mechanism, an oscillatory lever secured to said rock-shaft and carrying a driving-pawl to actuate said ratchet-wheel and connected spur-gear, a setting mechanism to control the engagement of the pawl with the ratchet-wheel at a point determined by the amount to be registered, a lever provided at one end with a vertically-movable pin or detent to engage the stop-wheel, and a vertically-movable stop-rod resting on the other end of said lever and actuated by the pawl-carrying lever at the end of its forward throw after the registering mechanism has been operated to prevent further movement of said mechanism, substantially as described.

14. In a cash-register, the combination of a register mechanism, a rock-shaft provided with an operating device, a sleeve loosely mounted on said rock-shaft and provided with a spur-gear and ratchet-wheel, gearing connecting said spur-gear with the register mechanism, an oscillatory lever secured to said rock-shaft and carrying a driving-pawl to actuate said ratchet-wheel and connected spur-gear, a setting mechanism to control the engagement of the pawl with the ratchet-wheel to accord with the amount to be registered, a stationary circular rack, a reversible double-acting pawl carried by the oscillatory lever and adapted to engage said rack to prevent a retrograde movement of said lever until it has completed its throw in either direction, a centrally-fulcrumed reversing-lever actuated by the oscillatory pawl-carrying lever at the end of its stroke and adapted to automatically change the position of the reversible double-acting pawl, and a spring-catch to hold said double-acting pawl in the position to which it is automatically adjusted, substantially as described.

15. In a cash-register, the combination of a register mechanism, a rock-shaft provided with an operating-handle, a sleeve loosely mounted on said rock-shaft and provided with a spur-gear, a ratchet-wheel secured to said sleeve, gearing connecting said spur-gear with the register mechanism, an oscillatory lever secured to said rock-shaft and carrying a driving-pawl to actuate said ratchet-wheel and connected spur-gear, a friction-wheel secured to the loose sleeve that carries the ratchet-wheel and spur-gear, and a friction-block supported in bearing contact with said friction-wheel, substantially as described.

16. In a cash-register, the combination of a register mechanism comprising a tubular dollar-shaft and a concentric cent-shaft projecting beyond one end of said dollar-shaft, a rock-shaft geared with the cent-shaft and provided with an operating-handle, a ratchet-wheel secured to the dollar-shaft, a spring-actuated lever fulcrumed on the cent-shaft and carrying a spring-pawl engaged with said ratchet-wheel, a lever having a link connection with said pawl-carrying lever and provided with a lug or projection, and a cam secured to the cent-shaft and bearing on said lug or projection, whereby when the contracted portion of said cam passes the said lug or projection at the end of each complete revolution of the cent-shaft the spring-actuated pawl-carrying lever will be free to rise, and thereby cause its pawl to impart an impulse to the ratchet-wheel on the dollar-shaft, substantially as described.

17. In a cash-register, the combination of a register mechanism comprising a dollar-shaft and a concentric cent-shaft projecting beyond the dollar-shaft, a rock-shaft loosely geared with the cent-shaft and provided with an operating-handle, a ratchet-wheel fast on the dollar-shaft, a lever having one end fulcrumed on the cent-shaft, a spring supporting the other end of said lever, a pawl carried by said lever to actuate the ratchet-wheel, a lever pivotally supported below the cent-shaft and having its other end connected with the pawl-carrying lever, and a cam secured to the cent-shaft and bearing on a lug projecting from the lever that is supported below said shaft, whereby when the contracted portion of the cam passes said lug the pawl-carrying lever will be actuated by its spring to cause its pawl to impart an impulse to the ratchet-wheel on the dollar-shaft, substantially as described.

18. In a cash-register, the combination of a register mechanism comprising a tubular dollar-shaft and a cent-shaft inclosed by and projecting from said dollar-shaft, a rock-shaft loosely geared with the cent-shaft and provided with an operating device, a ratchet-wheel secured to the dollar-shaft and provided with one hundred teeth, a spring-actuated pawl-carrying lever for operating the dollar-shaft step by step through said ratchet-wheel, and a cam secured to the cent-shaft to control the operation of said pawl-and-ratchet mechanism, substantially as described.

19. In a cash-register, the combination of a register mechanism comprising a tubular dollar-shaft and a cent-shaft inclosed by and projecting from said dollar-shaft, a rock-shaft loosely geared with the dollar-shaft and provided with operating means, a ratchet-wheel secured to the dollar-shaft, a spring-actuated pawl-carrying lever for causing the ratchet-wheel to operate the dollar-shaft at each revolution of the cent-shaft, a cam secured to the cent-shaft to control the operation of said pawl-and-ratchet mechanism, pointers carried by the dollar and cent shafts, and a graduated dial for said pointers, substantially as described.

20. In a cash-register, the combination of a register mechanism comprising concentric dollar and cent shafts provided with pointers, a stationary dial graduated to show dollars and cents by the positions of said pointers, a rotary dial loosely mounted on the rotary dollar-shaft and adapted to indicate hundreds of dollars through an opening in the stationary dial, a ratchet-wheel loosely mounted on one end of the dollar-shaft and connected with said rotary dial, a spring-actuated pawl-carrying lever for causing said ratchet-wheel to operate the rotary dial at each complete revolution of the dollar-shaft, a cam secured to the dollar-shaft to control the operation of said pawl-carrying lever, a ratchet-wheel secured to the other end of said dollar-shaft, a spring-actuated pawl-carrying lever for causing said ratchet-wheel to operate the dollar-shaft at each complete revolution of the cent-shaft, a cam secured to the cent-shaft to control the operation of said pawl-carrying lever, a rock-shaft having an operating-handle, a sleeve loosely mounted on said rock-shaft and geared to the cent-shaft, a ratchet-wheel fast on said sleeve, an oscillatory lever secured to the rock-shaft and provided with a driving-pawl to actuate said ratchet-wheel, a setting mechanism comprising an adjustable cam to control the engagement of said pawl and ratchet-wheel, an operating-handle for said setting mechanism, and a dial to indicate the amount to be registered, substantially as described.

21. In a cash-register, the combination of a register mechanism, a casing having at one end a stationary dial graduated to indicate dollars and cents, in connection with a dollar-pointer and a cent-pointer, a tubular dollar-shaft carrying the dollar-pointer, a cent-shaft carrying the cent-pointer and inclosed by said tubular shaft, a rotary dial loosely mounted on the tubular shaft and graduated to indicate hundreds of dollars through an opening in the stationary dial at the end of the casing, intermittingly-actuated mechanism for moving the said rotary dial a definite distance at each complete revolution of the dollar-shaft, intermittingly-actuated mechanism for imparting a rotary movement to the dollar-shaft at each complete revolution of the cent-shaft, a rock-shaft geared to rotate the cent-shaft in one direction only, a setting mechanism provided with an operating-handle, and a rotary dial actuated from the handle of the setting mechanism to indicate and display the amount to be registered, substantially as described.

22. In a cash-register, the combination of a register mechanism comprising a dollar-shaft and a cent-shaft, a rock-shaft provided with operating means, a sleeve loosely mounted on said rock-shaft and geared with the cent-shaft, a ratchet-wheel secured to said sleeve, an oscillatory lever secured to the rock-shaft and carrying a pawl to engage and actuate said ratchet-wheel, a setting mechanism to control the engagement of said ratchet-wheel and pawl, a pawl-and-ratchet mechanism controlled from the cent-shaft to impart a partial rotation to the dollar-shaft at the completion of each revolution of the cent-shaft, a ratchet-wheel fast on the dollar-shaft, an oscillatory lever loosely mounted on the dollar-shaft and geared with the rock-shaft, a pawl carried by said lever to actuate said ratchet-wheel, a setting mechanism to control the engagement of said ratchet-wheel and pawl, spring-latching devices for normally holding each setting mechanism in the position to which it is adjusted, a trip device connected with the spring-latch of the dollar-setting mechanism, levers actuated from the spring-latch of the cent-setting mechanism to operate said trip device and release the dollar-setting mechanism, and recoil devices connected with said dollar-setting mechanism to automatically return the same to zero when the cent-setting mechanism is manipulated, substantially as described.

23. In a cash-register, the combination of a register mechanism comprising a dollar-shaft and a cent-shaft, a rock-shaft having an operating device, driving mechanism actuated from the rock-shaft to rotate the cent-shaft only when the rock-shaft is turned in one direction, a setting mechanism to control the operation of said cent-shaft-driving mechanism, a pawl-and-ratchet mechanism controlled from the cent-shaft to impart a partial rotation to the dollar-shaft at the completion of each revolution of the cent-shaft, driving mechanism actuated from the rock-shaft to rotate the dollar-shaft only when the rock-shaft is turned in one direction, a setting mechanism to control the operation of said dollar-shaft-driving mechanism, spring-latching devices for normally holding each setting mechanism in the position to which it is adjusted, a trip device connected with the spring-latch of the dollar-setting mechanism, levers actuated from the spring-latch of the cent-setting mechanism to operate said trip device and release the dollar-setting mechanism, and recoil devices connected with said dollar-setting mechanism to automatically return the same to zero when the cent-setting mechanism is manipulated, substantially as described.

24. In a cash-register, the combination of a register mechanism comprising a dollar-shaft and a cent shaft, a rock-shaft, means for operating said rock-shaft, driving mechanism actuated from the rock-shaft to rotate the cent-shaft, a pawl-and-ratchet mechanism controlled from the cent-shaft to impart a partial rotation to the dollar-shaft at the completion of each revolution of the cent-shaft, driving mechanism actuated from the rock-shaft to rotate the dollar-shaft, separate setting mechanism to control the operation of the said cent-shaft and dollar-shaft, latching or locking devices for normally holding each setting mechanism in the position to which it is adjusted, a recoil mechanism connected with the dollar-setting mechanism and in which power is stored by operating said setting mechanism to control the amount of dollars to be registered, and mechanism actuated from the cent-setting mechanism to automatically release the dollar-setting mechanism and permit its return to zero under the action of the recoil mechanism when the cent-setting mechanism is manipulated, substantially as described.

25. In a cash-register, the combination of a register mechanism comprising a cent-shaft, a dollar-shaft, pointers carried by said shafts, a stationary dial whereon the said pointers will indicate the amounts registered, a rotary dial carried by the dollar-shaft and graduated to indicate hundreds of dollars through an opening in the stationary dial, separate setting mechanisms for controlling the operation of the dollar and cent shafts, mechanism actuated from the cent-setting mechanism to cause the automatic return of the dollar-setting mechanism to zero, stops for said setting mechanisms, dials and pointers to indicate when the setting mechanisms are in proper position to determine the registration of the desired amount, an automatically-opening cash-drawer, a bolt for automatically locking said drawer when closed, a rock-shaft from which the register mechanisms is actuated, levers actuated from said rock-shaft to automatically disengage said bolt and release the drawer after the register mechanism has been operated, and devices for automatically locking the setting mechanisms and the register mechanism until the cash-drawer is again closed and locked, substantially as described.

26. In a cash-register, the combination of a register mechanism comprising dials and pointers for showing the total amount registered, setting mechanism for controlling the amount to be registered at any operation of the machine, a rotary dial actuated from the handle of the setting mechanism to indicate and display the amount to be registered, a rock-shaft from which the register mechanism is actuated, an automatically-opening cash-drawer having an automatic locking mechanism, a series of levers actuated from the rock-shaft to unlock and release the drawer after the register mechanism has been operated, an alarm automatically sounded by the movement of one of said levers on the unlocking and opening of the drawer, and devices actuated by said levers to automatically lock the setting mechanism and the register mechanism against further operation until the drawer is again closed and automatically locked, substantially as described.

In testimony whereof I have hereunto set my hand and affixed my seal in presence of two subscribing witnesses.

EDWARD MURPHY. [L. S.]

Witnesses:
ALBERT H. NORRIS,
JAMES A. RUTHERFORD.